US012742343B2

(12) United States Patent
Chen et al.

(10) Patent No.: US 12,742,343 B2
(45) Date of Patent: Sep. 22, 2026

(54) ELECTRONIC DOOR LOCK

(71) Applicant: TLHM CO., LTD, Chiayi City (TW)

(72) Inventors: Po-Yang Chen, Chiayi City (TW); Chia-Chen Chang, Chiayi City (TW); Chia-Hung Yen, Chiayi City (TW)

(73) Assignee: TLHM CO., LTD, Chiayi City (TW)

(*) Notice: Subject to any disclaimer, the term of this patent is extended or adjusted under 35 U.S.C. 154(b) by 358 days.

(21) Appl. No.: 17/689,147

(22) Filed: Mar. 8, 2022

(65) Prior Publication Data

US 2023/0061772 A1 Mar. 2, 2023

(30) Foreign Application Priority Data

Aug. 27, 2021 (TW) ................................ 110131909

(51) Int. Cl.

*E05B 47/00* (2006.01)
*E05B 47/06* (2006.01)
*E05B 63/08* (2006.01)

(52) U.S. Cl.

CPC ...... *E05B 47/0012* (2013.01); *E05B 47/0676* (2013.01); *E05B 2047/0017* (2013.01);
(Continued)

(58) Field of Classification Search

CPC ..... E05B 2047/0026; E05B 2047/0031; E05B 47/0676; E05B 47/0692; E05B 47/0012;
(Continued)

(56) References Cited

U.S. PATENT DOCUMENTS 2,453,505 A * 11/1948 Fornwald ............ E05B 47/0692 292/144
3,999,411 A * 12/1976 Kambic .................. E05B 55/12 70/144
(Continued)

FOREIGN PATENT DOCUMENTS

CN 2869236 Y * 2/2007 ......... E05B 15/1621
CN 203361786 U * 12/2013
(Continued)

OTHER PUBLICATIONS

TW M404254 U Annotated machine translation (Year: 2011).*
(Continued)

*Primary Examiner* — Christine M Mills
*Assistant Examiner* — Peter H Watson
(74) *Attorney, Agent, or Firm* — Amin, Turocy & Watson, LLP

(57) ABSTRACT

An electronic door lock is provided and includes a housing, a movable latch assembly, a sliding rod, a driving member, an elastic member and a driving assembly. The sliding rod is arranged in the movable latch assembly, and the elastic member is connected to the movable latch assembly and the driving assembly. The elastic member is driven by the driving assembly to drive the movable latch assembly, so that the sliding rod located in the movable latch assembly can be controlled to retract or protrude from the movable latch assembly and the movable latch assembly is in a locked mode or an unlocked mode. In the unlocked mode, the driving member can push the sliding rod to drive the movable latch assembly to move. Therefore, the problem that the driving assembly must accurately calculate the operating time can be solved and damage to the driving assembly can be prevented.

6 Claims, 10 Drawing Sheets

(52) U.S. Cl.
CPC ................. *E05B 2047/0031* (2013.01); *E05B 2047/0069* (2013.01); *E05B 63/08* (2013.01)

(58) Field of Classification Search
CPC ..... E05B 2047/0017; E05B 2047/0068; E05B 2047/0069; E05B 13/005; E05B 13/101; E05B 15/102; E05B 55/06; E05B 63/08; E05B 2015/0448
See application file for complete search history.

(56) References Cited

U.S. PATENT DOCUMENTS

| | | | | |
|---|---|---|---|---|
| 2005/0050928 | A1* | 3/2005 | Frolov | E05B 47/068 70/277 |
| 2005/0086984 | A1* | 4/2005 | Errani | E05B 47/0692 70/283 |
| 2006/0021404 | A1* | 2/2006 | Menta San Miguel | E05B 47/0692 70/472 |
| 2010/0225123 | A1* | 9/2010 | Chiang | E05B 9/02 292/1.5 |
| 2010/0225126 | A1* | 9/2010 | Chiang | A61P 31/14 292/164 |
| 2016/0375761 | A1* | 12/2016 | Horikawa | E05B 81/40 49/276 |
| 2021/0348946 | A1* | 11/2021 | Chen | E05B 39/00 |

FOREIGN PATENT DOCUMENTS

| | | | | |
|---|---|---|---|---|
| KR | 101336394 B1 | * | 12/2013 | |
| TW | M404254 U | * | 5/2011 | E05B 47/02 |
| TW | M506869 U | * | 8/2015 | |
| WO | WO-2004099640 A2 | * | 11/2004 | E05B 47/0011 |

OTHER PUBLICATIONS

WO-2004099640-A2 machine translation (Year: 2004).*
KR 101336394 B1 annotated machine translation (Year: 2013).*
CN-203361786-U machine translation (Year: 2013).*
TW M506869 U Machine translation (Year: 2015).*
CN 2869236 Y Machine translation (Year: 2007).*

* cited by examiner

ELECTRONIC DOOR LOCK

BACKGROUND

1. Technical Field

The present disclosure relates to a door lock, and more particularly, to an electronic door lock.

2. Description of Related Art

Conventional door lock is usually equipped with a matching key for user to lock or unlock. However, the key can be easily copied or lost, and the door lock can also be unlocked via unlocking techniques, so the security of the conventional door lock is not good.

Nowadays, door lock has been developed toward electronic door lock. Different from conventional door lock, electronic door lock adds electronic driving device and sensor into the existing mechanical structure, and the functions of automatic unlocking and identification are provided via the electronic driving device, so that user does not need to rely on the key. That is, the door lock can be opened via the chip key or password. Moreover, the electronic door lock determines the state of the electronic door lock via the arrangement of the sensor and warns the user when there is a malfunction or when the door lock is illegally opened. Therefore, the electronic door lock is more convenient and safer than the conventional door lock.

However, after the electronic door lock is added with electronic components such as electronic driving device and sensor, the internal structure of the electronic door lock is replicated. Therefore, additional internal space is required for the installation of various electronic components, so that there is room for improvement in the construction of electronic door lock. In addition, the electronic driving structure of the existing electronic door lock during the actuation process must first calculate the operating time of the motor according to the stroke required to actuate in the process, so that the driven mechanical structure can be precise and the operation of the motor can be switch off in an appropriate time to avoid damage to the motor due to calculation inaccuracy, which results that under the requirement of reducing the electronic component volume, more attention should be paid to whether the operation of the door lock is accurate and smooth.

In view of this, there is a need in the art to find an electronic door lock with simplified structure to provide more assembly space and prevent the reduction of the service life of the motor without the need to accurately calculate the actuation stroke.

SUMMARY

In view of the aforementioned problems of the prior art, the present disclosure provides an electronic door lock, which comprises: a housing; a movable latch assembly arranged in the housing and having a movable member, a movable latch head coupled to a front end of the movable member and protruding from an outside of the housing, and a toggle member coupled to a rear end of the movable member; a sliding rod corresponding to the toggle member and arranged in the movable member and having an abutting surface; a driving member rotatably arranged in the housing and having a pushing block corresponding to the abutting surface of the sliding rod; an elastic member arranged in the housing and having a connecting end connected with the toggle member and an active end relative to the connecting end; and a driving assembly arranged in the housing and including a driving component located in an active region, wherein the active end of the elastic member is configured to be moved in the active region by controlling the driving component to drive the active end, wherein when the active end is moved to a first position of the active region, the elastic member drives the toggle member to move in a direction toward the movable member, such that the toggle member pushes the sliding rod to extend perpendicularly to a moving direction of the movable member to enable the pushing block to push and abut against the abutting surface of the sliding rod, or when the active end is moved to a second position of the active region, the elastic member drives the toggle member to move in a direction away from the movable member, such that the sliding rod disengages from pushing of the toggle member and retracts into the movable member to enable the pushing block free from being contacted with the abutting surface of the sliding rod.

In an embodiment, the electronic door lock according to the present disclosure further includes a transmission base rotatably arranged in the housing and having a first inner side wall and a second inner side wall, wherein the elastic member includes an elastic body and a first extension portion and a second extension portion extending outward from the elastic body, and wherein the elastic body is arranged in the transmission base, the first extension portion is fixed at the first inner side wall, and the second extension portion is pushed and abutted against the second inner side wall, such that the second extension portion is swung between the first inner side wall and the second inner side wall.

In an embodiment, the elastic member is a compression spring or a torsion spring.

In an embodiment, the electronic door lock according to the present disclosure further includes a returning spring arranged between the sliding rod and the movable member, wherein the sliding rod is retracted into the movable member when the sliding rod is not pushed by the toggle member.

In an embodiment, the toggle member is arranged with a groove corresponding to the sliding rod, wherein one side of the groove has an inclined pushing surface, and the sliding rod has an inclined abutting surface corresponding to the inclined pushing surface, and wherein when the active end moves to the first position, the inclined pushing surface of the toggle member pushes the inclined abutting surface of the sliding rod to enable the abutting surface of the sliding rod to extend outward.

In an embodiment, the driving assembly further includes a driving motor connected to the worm driving component and configured to provide power.

In an embodiment, the driving assembly further includes a fixed base for accommodating the driving motor and having a sliding groove, a sliding block arranged in the sliding groove with one end connected to the active end, and a sliding block sensor near the sliding groove and configured for sensing a position of the sliding block.

In an embodiment, the driving assembly further includes an auxiliary spring with one end fixed to the fixed base and the other end pushing and abutting upward against the sliding block.

In an embodiment, the electronic door lock according to the present disclosure further includes a fixed latch assembly including a driving unit movably arranged in the housing and a fixed latch connected with the driving unit, wherein the fixed latch is driven to retract into the housing when the driving unit is forced to move in a direction toward an inside of the housing, or the fixed latch is driven to protrude out of the housing when the driving unit is forced to move in a direction toward an outside of the housing; and a fixed latch sensor corresponding to the fixed latch assembly and arranged in the housing, wherein the fixed latch sensor is configured for sensing a state of the fixed latch assembly.

In another embodiment, the electronic door lock according to the present disclosure further includes an anti-theft latch assembly including a touch member movably arranged in the housing, an anti-theft latch connected with the touch member, and a touch rod arranged corresponding to the touch member, wherein the anti-theft latch drives the touch rod via the touch member when a door is closed or opened; and an anti-theft latch sensor corresponding to the anti-theft latch assembly and arranged in the housing, wherein the anti-theft latch sensor is configured for sensing a position of the touch rod to determine a state of the anti-theft latch assembly.

In summary, the electronic door lock according to the present disclosure connects the elastic member to the movable member of the movable latch assembly and the driving assembly and uses elastic force to keep the elastic member in the active region where the driving component is located at any time to ensure that the driving assembly will not have a delay time due to idling, so that the purpose of saving power can be achieved. In addition, the elastic member according to the present disclosure will not lock the driving assembly when the driving assembly exceeds the operating stroke and causes damage to the driving assembly due to overheating or overloading, thereby achieving the purpose of protecting the driving assembly.

DETAILED DESCRIPTION OF THE EMBODIMENTS

Implementations of the present disclosure are described below by specific embodiments. Those skilled in the art can easily understand advantages and technical effects of the present disclosure based on the content disclosed in this specification, and also implement or apply other equivalent implementations.

Figure 1:
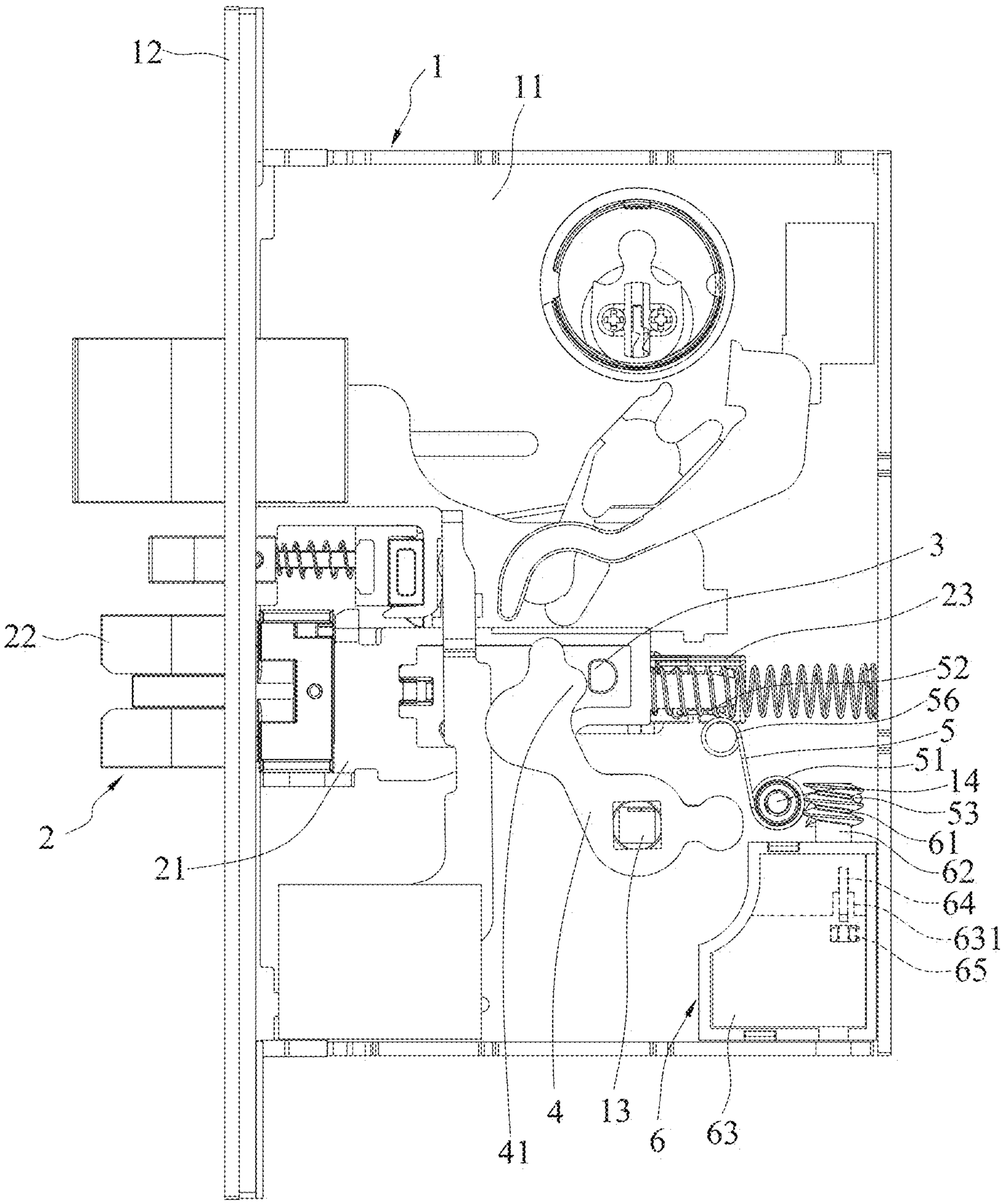
FIG. 1 is a schematic view of a structure of an electronic door lock according to the present disclosure.
Figure 2A:
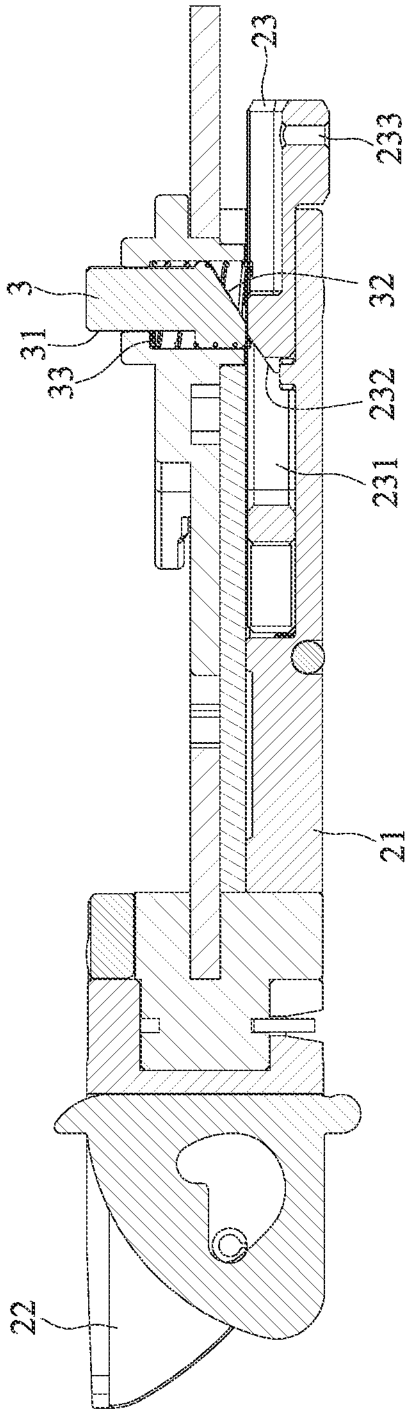
FIG. 2A is a schematic cross-sectional view of a movable latch assembly of the electronic door lock according to the present disclosure in the unlocked mode.
Figure 2B:
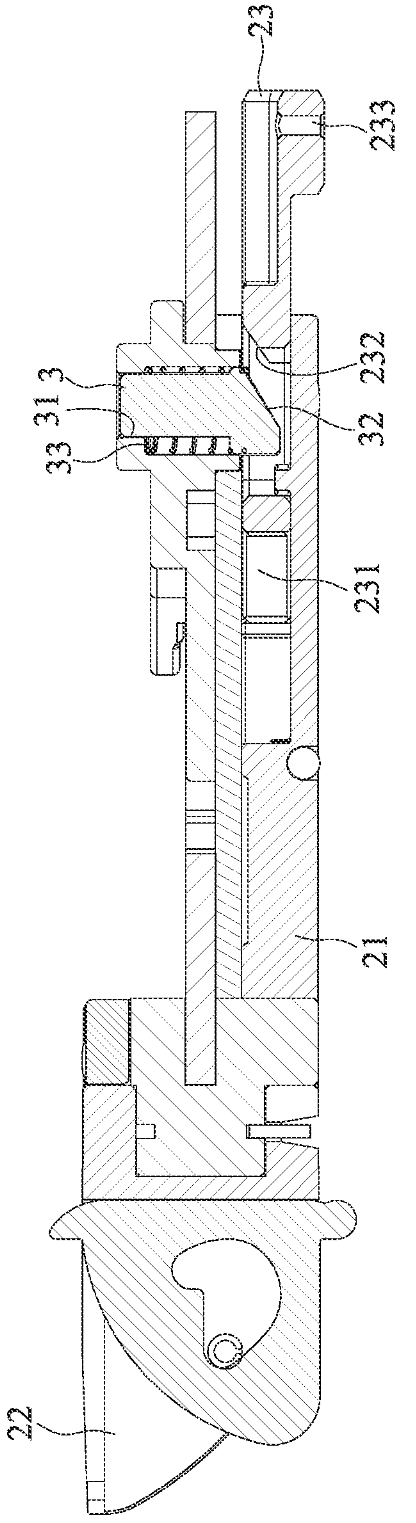
FIG. 2B is a schematic cross-sectional view of the movable latch assembly of the electronic door lock according to the present disclosure in the locked mode.

FIG. 1 is a schematic view of a structure of an electronic door lock according to the present disclosure. FIG. 2A and FIG. 2B are schematic cross-sectional views of a movable latch assembly of the electronic door lock according to the present disclosure in the unlocked mode and the locked mode, respectively. As shown in the figures, the electronic door lock according to the present disclosure includes a housing 1, a movable latch assembly 2, a sliding rod 3, a driving member 4, an elastic member 5, and a driving assembly 6. The housing 1 is configured to install the movable latch assembly 2, the sliding rod 3, the driving member 4, the elastic member 5, and the driving assembly 6. The elastic member 5 is driven by the driving assembly 6 to control the sliding rod 3 provided in the movable latch assembly 2 to retract into the movable latch assembly 2 or protrude out of the movable latch assembly 2, thereby switching to a locked mode or an unlocked mode. In the unlocked mode, the elastic member 5 pushes the sliding rod 3 to drive the movable latch assembly 2 to move. The detailed description of the electronic door lock according to the present disclosure is as follows.

The housing 1 has an accommodation space 11 in the housing 1, a cover plate (not shown) provided on the accommodation space 11, and a panel 12 provided on a side of the accommodation space 11. The housing 1 is installed in a house door, and the panel 12 is located on a side of the house door. In other words, the accommodation space 11 of the housing 1 accommodates the movable latch assembly 2, the sliding rod 3, the driving member 4, the elastic member 5 and the driving assembly 6 installed therein and is packaged by the cover plate. The panel 12 forms and communicates an opening of the accommodation space 11 for providing a portion of the movable latch assembly 2 to extend out of the housing 1 or retract into the housing 1 via the opening.

The movable latch assembly 2 is installed in the housing 1 and includes a movable member 21, a movable latch head 22, and a toggle member 23. In detail, the movable latch head 22 is located at a front end of the movable member 21. The movable latch head 22 protrudes from the front end of the movable member 21 to an outer side of the panel 12 via the opening of the accommodation space 11 and is exposed from the housing 1. The movable latch head 22 moves with the movable member 21, so that when the movable member 21 moves, the movable latch head 22 extends out of or retracts into the housing 1 accordingly. The toggle member 23 is located at a rear end of the movable member 21 and partially disposed in the movable member 21. When the movable member 21 moves, the movable member 21 will drive the toggle member 23. In addition, when other external forces are applied to the toggle member 23, the toggle member 23 can displace relative to the movable member 21 in the movable member 21.

As shown in FIG. 2A, the toggle member 23 is formed with a groove 231, and an inner side surface in the groove 231 is an inclined pushing surface 232. The relationship between the sliding rod 3 and the movable latch assembly 2 will be described.

The sliding rod 3 is in the shape of a short pillar and is disposed in the movable member 21 corresponding to the toggle member 23. The movable member 21 is formed with a through hole penetrating to the groove 231 for the sliding rod 3 to be inserted therein. The sliding rod 3 can move in the through hole. When the sliding rod 3 moves, one end of the sliding rod 3 protrudes out of the through hole or retracts into the through hole.

As shown in FIG. 2A, one end of the sliding rod 3 has an abutting surface 31, and the other end of the sliding rod 3 has an inclined abutting surface 32 corresponding to the inclined pushing surface 232 of the toggle member 23. For example, as shown in FIG. 2A, in an unlocked mode, the toggle member 23 moves relative to the movable member 21 toward the front end of the movable member 21 (left side of FIG. 2A), so that the inclined pushing surface 232 pushes and abuts against the inclined abutting surface 32 of the sliding rod 3, the sliding rod 3 is forced and moves out of the through hole (top of FIG. 2A), and the abutting surface 31 is exposed from the outside of the movable member 21. Moreover, as shown in FIG. 2B, in a locked mode, the toggle member 23 moves relative to the movable member 21 toward the rear end of the movable member 21 (right side of FIG. 2A), so that the inclined pushing surface 232 is away from the inclined abutting surface 32 of the sliding rod 3. That is, the sliding rod 3 retracts into the through hole, and at this time, the abutting surface 31 returns and retracts into the movable member 21. In an embodiment, a returning spring 33 is provided between the sliding rod 3 and the movable member 21. The returning spring 33 is arranged in the through hole to push and abut against the sliding rod 3 in the direction of the toggle member 23. That is, in the locked mode, the sliding rod 3 is pushed to achieve the purpose of returning.

As shown in FIGS. 1, 2A and 2B, the driving member 4 is rotatably installed on a first rotating shaft 13 of the housing 1. That is, a short arm is formed radially extending from the first rotating shaft 13 and a pushing block 41 is formed at the short arm corresponding to the abutting surface 31 of the sliding rod 3. The driving member 4 is connected to a handle for opening the door outside the housing 1, so that when the handle is turned, the driving member 4 swings on the first rotating shaft 13, so that in the unlocked mode, the pushing block 41 can contact the abutting surface 31 of the sliding rod 3. By pushing the sliding rod 3 to drive the movable member 21 to move, the movable latch head 22 is retracted into the housing 1, and the house door can be opened.

Figure 3A:
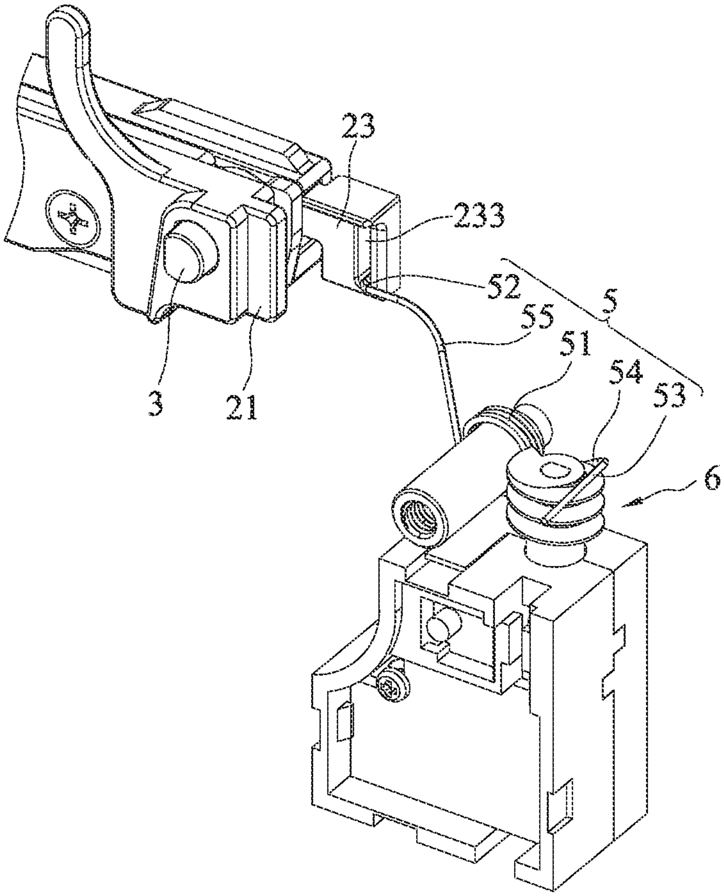
FIG. 3A is a schematic view of a structure of an elastic member of the electronic door lock according to a first embodiment of the present disclosure.

FIG. 3A is a schematic view of a structure of an elastic member of the electronic door lock according to a first embodiment of the present disclosure. As shown in FIG. 3A (please refer to FIG. 1 at the same time), in an embodiment, the elastic member 5 is a torsion spring, which includes an elastic body 51 that provides elastic force for extension and compression. One end of the elastic body 51 extends to form a connecting end 52 connected to the toggle member 23, and the other end extends to form an active end 53 driven by the driving assembly 6. The elastic member 5 further includes a first extension portion 54 extending outward from the elastic body 51 to connect the active end 53 and a second extension portion 55 connected to the connecting end 52.

Under the aforementioned structure, the elastic member 5 is rotatably sleeved on a fixed shaft 14 of the housing 1 via the elastic body 51, so that the connecting end 52 extends toward the toggle member 23 and is connected to the toggle member 23, and the active end 53 extends toward the driving assembly 6 and is connected to the driving assembly 6. In other words, the toggle member 23 is longitudinally provided with a longitudinal groove 233 for the connecting end 52 to pass through. When the elastic member 5 is driven by the power of the driving assembly 6 to drive the toggle member 23 to move, the connecting end 52 is moved upward and downward in the longitudinal groove 233 to prevent the elastic member 5 from being forced to squeeze and cause irreversible deformation when the elastic member 5 drives the toggle member 23, thereby affecting the service life of the elastic member 5. Accordingly, in the unlocked mode, the driving assembly 6 drives the active end 53 to move upward, the elastic member 5 rotates via the elastic body 51 provided on the fixed shaft 14 and drives the connecting end 52 to actuate, so that the toggle member 23 pushes the sliding rod 3 out of the movable member 21. Alternatively, in the locked mode, the driving assembly 6 drives the active end 53 to move downward, the toggle member 23 moves toward the rear side of the movable member 21 (right side of FIG. 3A) based on the actuation of the connecting end 52 driven by the elastic body 51, so that the sliding rod 3 retracts into the movable member 21.

Figure 3B:
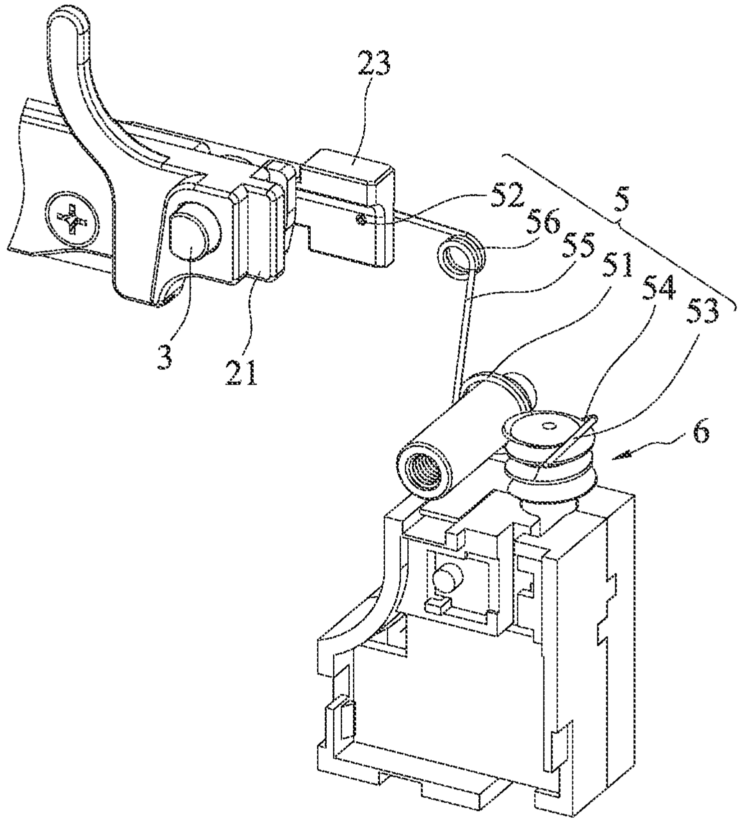
FIG. 3B is a schematic view of a structure of the elastic member of the electronic door lock according to a second embodiment of the present disclosure.

FIG. 3B is a schematic view of a structure of an elastic member of the electronic door lock according to a second embodiment of the present disclosure. FIG. 3B is another embodiment similar to the elastic member 5 of FIG. 3A. As shown in FIG. 3B, the elastic member 5 includes a buffer 56 disposed on the second extension portion 55. The buffer 56 provides the function of buffer compression when the second extension portion 55 is stressed. That is, when the movable member 21 pushes and presses the elastic member 5, the buffer 56 provides a space for buffering compression. Moreover, based on the design of the buffer 56, the longitudinal groove 233 of the toggle member 23 can be designed as a circular opening to prevent the problem that the connecting end 52 is frequently actuated in the longitudinal groove 233 and damaged.

Figure 3C:
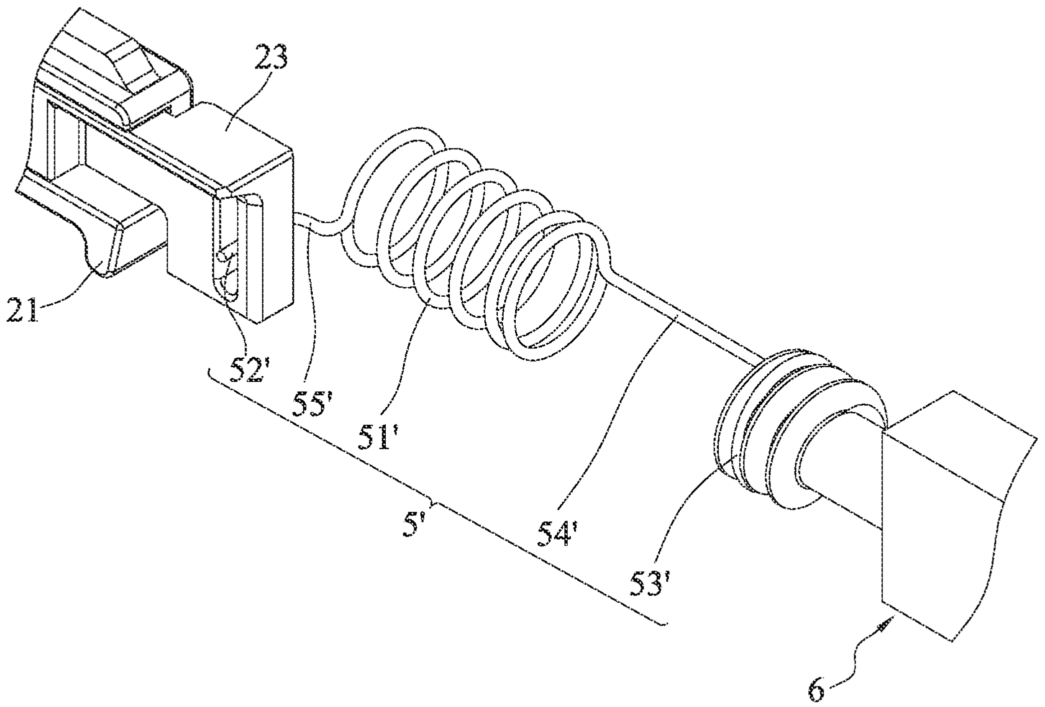
FIG. 3C is a schematic view of a structure of the elastic member of the electronic door lock according to a third embodiment of the present disclosure.

FIG. 3C is a schematic view of a structure of an elastic member of the electronic door lock according to a third embodiment of the present disclosure. As shown in FIG. 3C (please refer to FIG. 1 at the same time), in an embodiment, an elastic member 5' according to the present disclosure is a compression spring, which includes an elastic body 51', a connecting end 52', an active end 53', a first extension portion 54', and a second extension portion 55', wherein the present disclosure uses the driving assembly 6 to drive the active end 53' and drives the connecting end 52' via the elastic body 51', this causes the relative displacement of the toggle member 23 and the movable member 21, so that the sliding rod 3 protrudes out of the movable member 21 in the unlocked mode or retracts into the movable member 21 in the locked mode. In addition, the elastic body 51' of the elastic member 5' provides compressive elastic force, so that when the movable member 21 is forced and moved backward (right side of FIG. 3C), the movement of the movable member 21 is free from being hindered via the compressed elastic body 51'. And when the movable member 21 is not forced or under force, the compressed elastic body 51' pushes the movable member 21 to move and return in the direction of the panel 12 shown in FIG. 1.

It can be known from the above that the elastic member of the electronic door lock according to the present disclosure may have many forms. The foregoing descriptions only illustrate two examples, but the present disclosure is not limited as such. The elastic member according to the present disclosure will be illustrated by the first embodiment below.

Figure 4A:
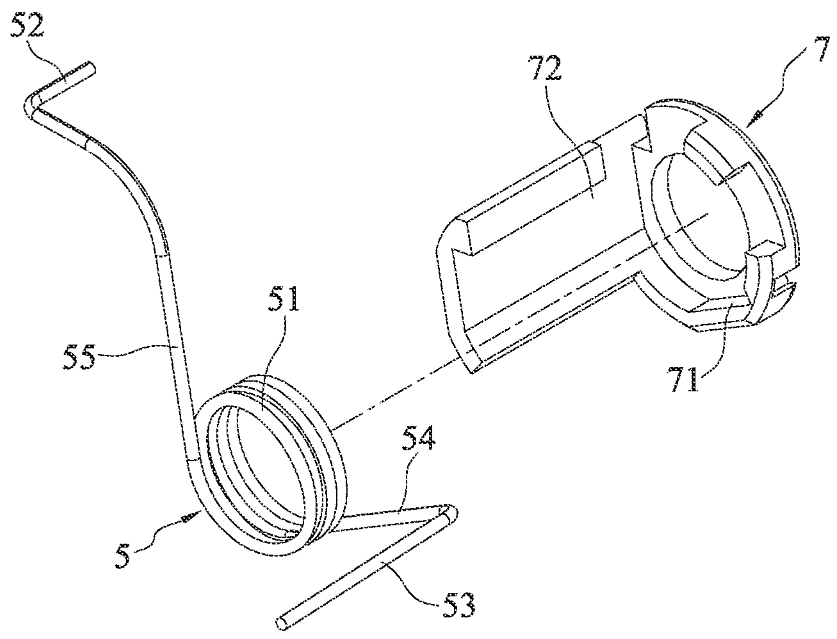
FIG. 4A is a schematic view of a structure of the elastic member and a transmission base of the electronic door lock according to an embodiment of the present disclosure.

FIG. 4A is a schematic view of structures of an elastic member and a transmission base of the electronic door lock according to a first embodiment of the present disclosure. As shown in FIG. 4A, the present disclosure further includes a transmission base 7 rotatably arranged in the housing 1, wherein the transmission base 7 is configured to accommodate the elastic body 51. The internal of the transmission base 7 has a first inner side wall 71 for fixing the first extension portion 54 of the elastic member 5 and a second inner side wall 72 for abutting the second extension portion 55 of the elastic member 5. That is, the elastic member 5 is combined with the transmission base 7 by arranging the elastic body 51 in the transmission base 7 and is sleeved on the fixed shaft 14 of the housing 1 (as shown in FIG. 1). The active end 53 passes through an opening on the transmission base 7, so that the first extension portion 54 is fixed at the first inner side wall 71 and the second extension portion 55 abuts against the second inner side wall 72, so that the second extension portion 55 can swing between the first inner side wall 71 and the second inner side wall 72.

Figure 4B:
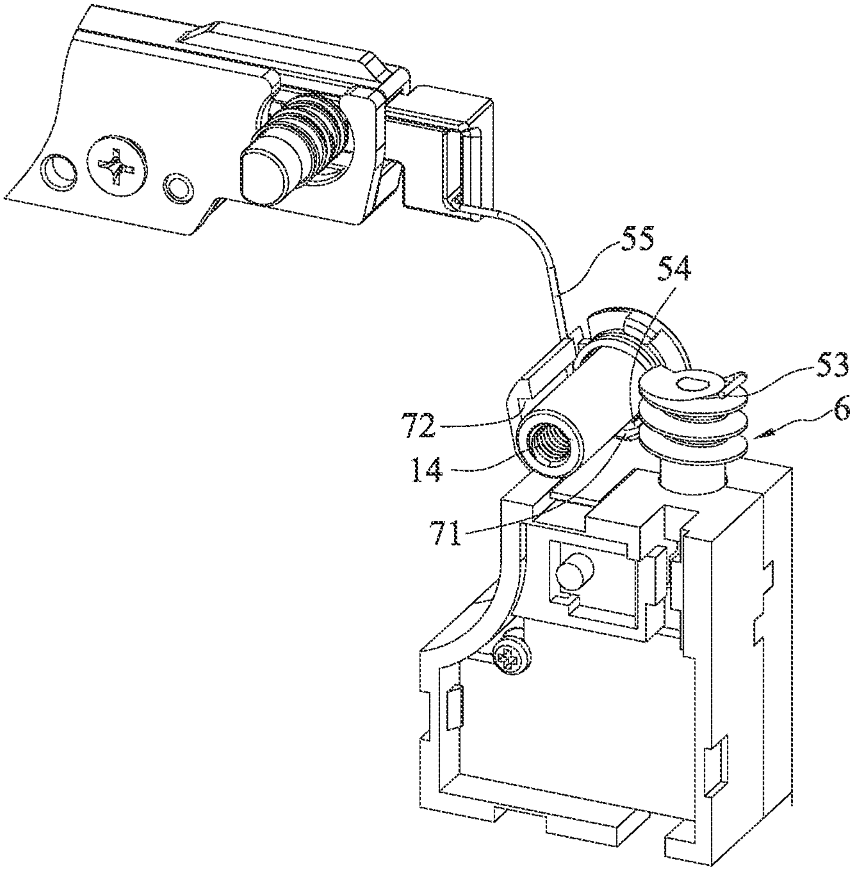
FIG. 4B is a schematic view of a structure of the electronic door lock in the embodiment of FIG. 4A according to the present disclosure.
Figure 5:
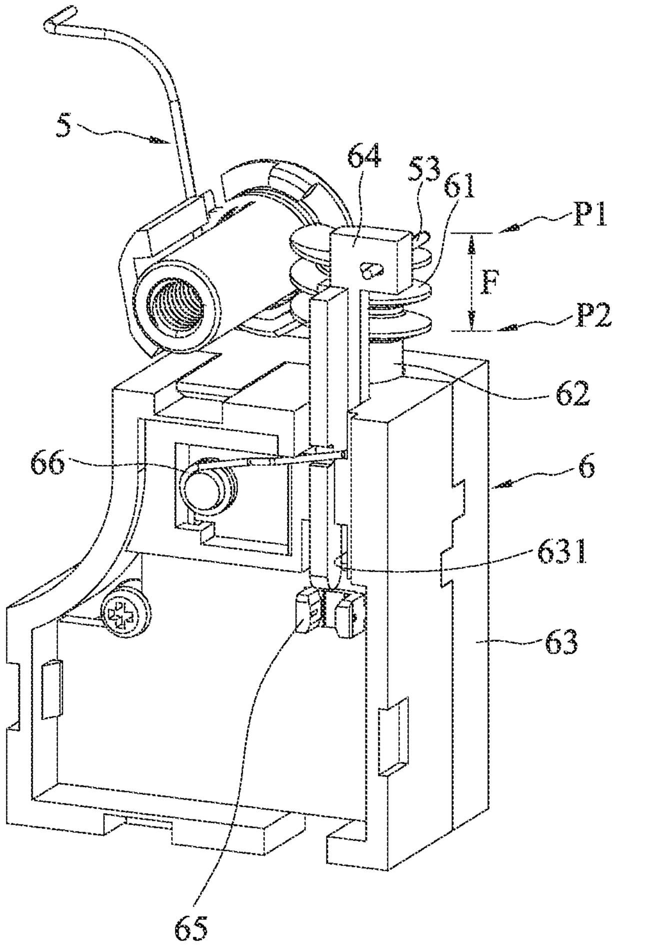
FIG. 5 is a schematic view of a structure of a driving assembly of the electronic door lock according to the present disclosure.

FIG. 4B is a schematic view of a structure of the electronic door lock using an embodiment of FIG. 4A according to the present disclosure. As shown in FIG. 4B (please refer to FIG. 4A at the same time), the first inner side wall 71 and the second inner side wall 72 of the transmission base 7 are formed as a V shape, so that the first extension portion 54 and the second extension portion 55 of the elastic member 5 can only swing relatively between the first inner side wall 71 and the second inner side wall 72. That is, the second extension portion 55 is resisted by the second inner side wall 72 and cannot continue to expand. When the driving assembly 6 drives the active end 53 of the elastic member 5, the elastic member 5 can be immediately caused to swing the second extension portion 55 via the transmission base 7, so that the connecting end 52 drives the toggle member 23 to move relative to the movable member 21. In this way, the driving assembly 6 will not cause the problem of delay due to idling. In addition, when the movable member 21 moves backward (right side of FIG. 4B) under force, the second extension portion 55 is pushed to compress the elastic body 51, so that the movable member 21 moves backward smoothly, and the second extension portion 55 is prevented from being forced to squeeze and cause deformation during the backward movement of the movable member 21. FIG. 5 is a schematic view of a structure of a driving assembly of the electronic door lock according to the present disclosure. As shown in FIG. 5, the driving assembly 6 is installed in the housing 1 shown in FIG. 1. The driving assembly 6 includes a driving component 61 located in an active region F and a driving motor 62 that provides power to the driving component 61. In an embodiment, the driving component 61 is a worm (e.g., worm gear). The driving assembly 6 includes the worm as the driving component 61 and the driving motor 62 that moves the worm and provides power. The driving assembly 6 drives the active end 53 to move in the range of the active region F by controlling the driving component 61. That is, the worm is driven by the driving motor 62 to make the worm rotate forward or backward, so that the active end 53 is displaced in the active region F.

In an embodiment, the driving assembly 6 further includes a fixed base 63, a sliding block 64, and a sliding block sensor 65, wherein the fixed base 63 is configured for accommodating the driving motor 62 and has a longitudinally recessed sliding groove 631 on the outer side surface thereof for the sliding block 64 to be disposed in the sliding groove 631. An upper end of the sliding block 64 is connected with the active end 53 to be moved with the active end 53. In addition, the sliding block sensor 65 is arranged near the sliding groove 631, so that when the sliding block 64 is moving in the sliding groove 631, the position of the sliding block 64 can be sensed to determine the state of the sliding rod. The following description is illustrated with FIG. 1. When the driving motor 62 drives the driving component 61 to move toward a first position P1 and causes the sliding rod 3 to protrude out of the movable member 21, the driving component 61 simultaneously causes the sliding block 64 to move toward the sliding block sensor 65 and triggers (e.g., blocks) the sliding block sensor 65. At this time, the sliding rod is determined to be in the unlocked state. On the other hand, when the driving motor 62 drives the driving component 61 to move toward a second position P2 and causes the sliding rod 3 to retract into the movable member 21, the driving component 61 simultaneously causes the sliding block 64 to move in a direction away from the sliding block sensor 65 without triggering the sliding block sensor 65 so as to determine that the sliding rod 3 is in the locked state. In addition, after the driving motor 62 is operating, by determining whether the sliding block 64 is in correct position, it can be determined whether the electronic door lock has completed the unlocked mode or the locked mode during the operation of the driving motor 62. If the electronic door lock has not completed, that is, there is a failure in the electronic door lock (e.g., the elastic member 5 is broken), then the failure can be notified by issuing a warning.

In an embodiment, the driving assembly 6 further includes an auxiliary spring 66 with one end fixed to the fixed base 63 and the other end pushing and abutting upward against the sliding block 64. The auxiliary spring 66 can provide an upward thrust to the active end 53 by the sliding block 64, which can prevent the active end 53 from falling down due to the weight of the sliding block 64, disengaging from the driving component 61 and failing to receive the power of the driving component 61.

Accordingly, as shown in FIG. 2A and FIG. 5, when the active end 53 moves to the first position P1 of the active region F, the elastic member 5 drives the toggle member 23 to move toward the front of the movable member 21 (left side of FIG. 2A and FIG. 5), and the toggle member 23 pushes the abutting surface 31 of the sliding rod 3 to the outside of the movable member 21. For example, when the active end 53 moves to the first position P1 of the active region F, the inclined abutting surface 32 of the sliding rod 3 is pushed by the inclined pushing surface 232 of the toggle member 23, so that the abutting surface 31 of the sliding rod 3 protrudes toward the outside of the movable member 21 under force. At this time, when the driving member 4 is rotated by the handle, the pushing block 41 of the driving member 4 is pushed and abutted against the abutting surface 31, which in turn drives the movable member 21 to move backward (right side of FIG. 2A and FIG. 5) and enables the movable latch head 22 to retract into the housing, so that the house door can be opened.

On the contrary, as shown in FIG. 2B and FIG. 5, when the active end 53 moves to the second position P2 of the active region F, the elastic member 5 drives the toggle member 23 to move toward the rear of the movable member 21 (right side of FIG. 2B and FIG. 5). At this time, the sliding rod 3 is disengaged from the pushing and abutting of the toggle member 23 and is thus retracted (i.e., the abutting surface 31 is retracted into the movable member 21), so that the pushing block 41 of the driving member 4 cannot contact the abutting surface 31. That is, the pushing and abutting effect cannot be generated, and the house door cannot be opened and is kept closed.

In addition, by controlling the active end 53 of the elastic member 5 to move to the first position P1 or the second position P2 of the active region F, the elastic member 5 provides elastic force for the active end 53 to abut against the active region F, thereby preventing the active end 53 from disengaging from the driving component 61 and being unable to be driven by the driving component 61. In other words, the design that the active end 53 continuously abuts against the active region F via the elastic member 5 can prevent the driving motor 62 from having a delay time of idling. And under the scenario that the operating time of the driving motor 62 is not accurate enough, the driving motor 62 can be prevented from being damaged due to over-running, so the effect of protecting the driving motor can be achieved.

Figure 6:
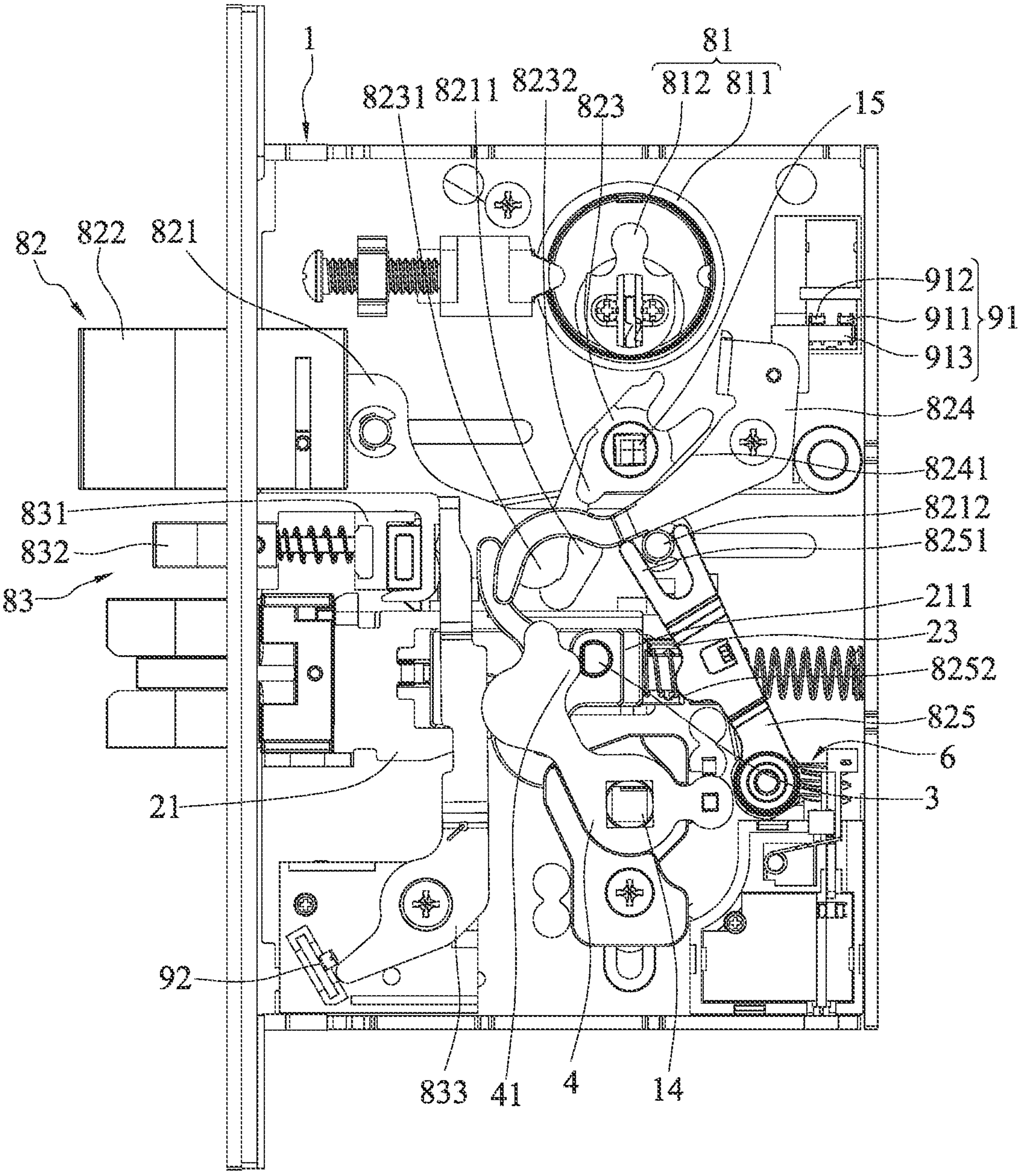
FIG. 6 is a schematic view of a structure of the electronic door lock according to the present disclosure when implemented.

FIG. 6 is a schematic view of a structure of the electronic door lock according to the present disclosure when implemented. As shown in FIG. 6, the electronic door lock according to the present disclosure further includes a lock head assembly 81, a fixed latch assembly 82, an anti-theft latch assembly 83, a fixed latch sensor 91 and an anti-theft latch sensor 92 and is described below.

The lock head assembly 81 is configured for the user to open the electronic door lock via a key. The lock head assembly 81 includes a lock head 811 exposed on the side of the exterior of the house door through the housing 1 and a swing block 812 arranged in the housing 1 and connected with the lock head 811. During operation, the user can rotate the lock head 811 to drive the swing block 812 when the key is inserted into the lock hole of the lock head 811. Then, the swing block 812 drives the fixed latch assembly 82 to move to the locked position or the unlocked position so as to lock or unlock the house door.

The fixed latch assembly 82 includes a driving unit 821 movably arranged in the housing 1 and having a pushing groove 8211 and a protruding rod 8212, a fixed latch 822 connected to a front end of the driving unit 821 and exposed from or submerged in the fixed latch 822 of the housing 1, a swing member 823 rotatably arranged to a second rotating shaft 15 of the housing 1 and having a protruding block 8232 and an extension end 8231 extending into the pushing groove 8211, a transmission rod 824 swingably arranged in the housing 1 and having a transmission surface 8241 corresponding to the protruding block 8232, and a linkage member 825 rotatably arranged on the fixed shaft 14 of the housing 1 and having a Y-shaped pushing end 8251 extending to two opposite sides of the protruding rod 8212 and a pushing block 8252 corresponding to a pushing surface 211 of the movable member 21.

In detail, when the driving unit 821 is forced to move forward (left side of FIG. 6), the fixed latch 822 is driven to protrude out of the housing 1 to lock the house door (i.e., the locked state); and when the driving unit 821 is forced to move backward (right side of FIG. 6), the fixed latch 822 is driven to retract into the housing 1 to release the locked state of the house door (i.e., the unlocked state). The unlocked state is described as follows. When the user is outside the house and the sliding rod 3 is protruded from the movable member 21, and when the movable member 21 is driven to move backward (right side of FIG. 6) via the driving member 4 driving by the handle on the outside of the door, the pushing surface 211 of the movable member 21 pushes and abuts against the pushing block 8252 to swing the linkage member 825, so that the pushing end 8251 of the linkage member 825 pushes and abuts against the protruding rod 8212 to move the driving unit 821 to move backward, so that the fixed latch 822 can submerge in the housing 1. At this time, the pushing groove 8211 of the driving unit 821 pushes the swing member 823 via the extension end 8231, so that the protruding block 8232 of the swing member 823 contacts and pushes and abuts against the transmission surface 8241 to push the transmission rod 824 to swing. Moreover, when the user is inside the house, the user can directly rotate the handle inside the door to drive a pushing rod to push the movable member 21 to move backward (right side of FIG. 6) so as to achieve the aforementioned unlocking purpose. Therefore, the electronic door lock according to the present disclosure can enable the fixed latch assembly 82 to actuate with the movable latch assembly when the wrench of the house door is pulled to open the door. Therefore, the user does not need to manually unlock the fixed latch 822 when opening the door.

Furthermore, the swing member 823 is moved with a rotary button (not shown) on the outside of the housing 1 on the second rotating shaft 15. When the rotary button is rotated, the swing member 823 is driven to swing so as to drive the fixed latch 822 to be in the locked state or the unlocked state (i.e., lock or unlock the fixed latch manually). The user rotates the rotary button located in the house to drive the swing member 823 to swing, so that the extension end 8231 pushes the driving unit 821 to the right side or the left side of FIG. 6 along an inner edge of the pushing groove 8211, so that the fixed latch 822 is submerged into or protruded from the housing 1 to complete unlocking or locking, respectively. In addition, when the swing member 823 swings toward the transmission surface 8241 of the transmission rod 824 and enables the protruding block 8232 to contact and push and abut against the transmission surface 8241, the protruding block 8232 can push the transmission rod 824 to swing. On the contrary, when the swing member 823 is driven to swing away from the transmission surface 8241, the transmission rod 824 is returned without being pushed by the protruding block 8232.

The fixed latch sensor 91 is arranged corresponding to the fixed latch assembly 82 in the housing 1 and has a first sensing unit 911, a second sensing unit 912, and a movable rod 913, wherein the movable rod 913 moves with the transmission rod 824 and is driven by the transmission rod 824, so that the movable rod 913 moves relative to the first sensing unit 911 and the second sensing unit 912 so as to sense the state of the fixed latch assembly 82. In detail, when the driving unit 821 moves backward under force (right side of FIG. 6) without triggering the first sensing unit 911 of the fixed latch sensor 91, the fixed latch sensor 91 can determine that the fixed latch assembly 82 is in the unlocked state and transmits an unlocking signal to the driving assembly 6, so that the driving assembly 6 pushes the sliding rod 3 out of the movable member 21 for the user to open the door via the handle. On the contrary, when the driving unit 821 moves forward under force (left side of FIG. 6) and enables the fixed latch sensor 91 to trigger the first sensing unit 911 and the second sensing unit 912 of the fixed latch sensor 91, the fixed latch sensor 91 can determine that the fixed latch assembly 82 is in the locked state and transmit a locking signal to the driving assembly 6, so that the driving assembly 6 retracts the sliding rod 3 into the movable member 21, and at this time the user cannot open the door via the handle. Moreover, the user uses the key to rotate the lock head 811 to drive the swing block 812 to rotate clockwise, the swing block 812 pushes the transmission rod 824 to drive the movable rod 913, so that the second sensing unit 912 is not triggered for the movable rod 913, thereby determining that the user unlocks the fixed latch assembly 82 via the key.

The anti-theft latch assembly 83 includes a touch member 831 movably arranged in the housing 1, an anti-theft latch 832 with a front end connected to the touch member 831, and a touch rod 833 arranged corresponding to a rear end of the anti-theft latch 832. The touch rod 833 is rotatably arranged on the housing 1 via a rotating shaft and has an upper end and a lower end. The upper end of the touch rod 833 extends from the rotating shaft to the rear end of the anti-theft latch 832, and the lower end of the touch rod 833 extends to the anti-theft latch sensor 92. When the user closes the house door, the anti-theft latch 832 is pressed by the door frame and retracts into the housing 1 and drives the touch member 831 to push and abut against the upper end of the touch rod 833 to move backward (right side of FIG. 6), and enables the lower end of the touch rod 833 to swing in the direction near the anti-theft latch sensor 92 via the rotating shaft so as to trigger the anti-theft latch sensor 92 and enable the anti-theft latch sensor 92 to sense the touch rod 833. On the contrary, when the house door is opened, the anti-theft latch 832 releases the pressing and abutting of the door frame and protrudes from the outside of the housing 1 to push the upper end of the touch rod 833 to move forward (left side of FIG. 6) and drive the lower end of the touch rod 833 to swing in the direction away from the anti-theft latch sensor 92 so as to enable the anti-theft latch sensor 92 not triggering for the touch member 831.

The anti-theft latch sensor 92 is arranged in the housing 1 and corresponding to the touch rod 833 of the anti-theft latch assembly 83. By determining whether the anti-theft latch sensor 92 is triggered by the lower end of the touch rod 833, whether the house door is currently in the closed state is detected.

In summary, the present disclosure directly connects the toggle member and the driving assembly via the elastic member, so that the sliding rod can protrude from the outside of the movable member when the driving assembly drives the toggle member via the elastic member, thereby forming the unlocked mode. On the contrary, the locked mode is formed when the sliding rod is retracted into the movable member. Since the elastic member has an elastic force that can be stretched or compressed, the active end of the elastic member can be ensured to continuously abut against the driving component. Therefore, when the driving component is actuated, the driving component can immediately drive the active end to move without having a delay time of idling, thereby achieving the purpose of saving power. In addition, the present disclosure can also prevent problems such as over-running and jamming or overheating of the driving assembly when the calculation of the operating time of the driving assembly is not accurate. Therefore, the present disclosure can have the effect of protecting the driving assembly.

The above-described descriptions of the detailed embodiments are to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. An electronic door lock, comprising:

a housing;

a movable latch assembly arranged in the housing and having a movable member, a movable latch head coupled to a front end of the movable member and protruding from an outside of the housing, and a toggle member coupled to a rear end of the movable member;

a sliding rod corresponding to the toggle member, arranged in the movable member and having an abutting surface;

a driving member rotatably arranged in the housing and having a pushing block corresponding to the abutting surface of the sliding rod;

an elastic member arranged in the housing and having an elastic body, an active end connected to the elastic body, a connecting end connected to the elastic body, and a buffer disposed between the elastic body and the connecting end, wherein the connecting end is directly connected with the toggle member, wherein the elastic body is a torsion spring, and the buffer is a torsion spring; and a driving assembly arranged in the housing and including a driving component located in an active region, wherein the active end of the elastic member is configured to be moved in the active region by controlling the driving component to drive the active end, wherein the driving component is a worm connected with the active end, and the active end is moved by the driving component rotated forward or backward, wherein the driving assembly further includes a driving motor connected to the driving component and configured to provide power, a fixed base for accommodating the driving motor and having a sliding groove, a sliding block arranged in the sliding groove with one end connected to the active end, and a sliding block sensor near the sliding groove and configured for sensing a position of the sliding block, wherein when the active end is moved to a first position of the active region, the elastic member drives the toggle member to move in a direction toward the movable member, such that the toggle member pushes the sliding rod to extend perpendicularly to a moving direction of the movable member to enable the pushing block to push and abut against the abutting surface of the sliding rod, or when the active end is moved to a second position of the active region, the elastic member drives the toggle member to move in a direction away from the movable member, such that the sliding rod disengages from pushing of the toggle member and retracts into the movable member to enable the pushing block free from being contacted with the abutting surface of the sliding rod.

2. The electronic door lock of claim 1, further comprising a returning spring arranged between the sliding rod and the movable member, wherein the sliding rod is retracted into the movable member when the sliding rod is not pushed by the toggle member.

3. The electronic door lock of claim 1, wherein the toggle member is arranged with a groove corresponding to the sliding rod, wherein one side of the groove has an inclined pushing surface, and the sliding rod has an inclined abutting surface corresponding to the inclined pushing surface, and wherein when the active end moves to the first position, the inclined pushing surface of the toggle member pushes the inclined abutting surface of the sliding rod to enable the abutting surface of the sliding rod to extend outward.

4. The electronic door lock of claim 1, wherein the driving assembly further includes an auxiliary spring with one end fixed to the fixed base and the other end pushing and abutting upward against the sliding block.

5. The electronic door lock of claim 1, further comprising:

a fixed latch assembly including a driving unit movably arranged in the housing and a fixed latch connected with the driving unit, wherein the fixed latch is driven to retract into the housing when the driving unit is forced to move in a direction toward an inside of the housing, or the fixed latch is driven to protrude out of the housing when the driving unit is forced to move in a direction toward an outside of the housing; and a fixed latch sensor corresponding to the fixed latch assembly and arranged in the housing, wherein the fixed latch sensor is configured for sensing a state of the fixed latch assembly.

6. The electronic door lock of claim 1, further comprising:

an anti-theft latch assembly including a touch member movably arranged in the housing, an anti-theft latch connected with the touch member, and a touch rod arranged corresponding to the touch member, wherein the anti-theft latch drives the touch rod via the touch member when a door is closed or opened; and an anti-theft latch sensor corresponding to the anti-theft latch assembly and arranged in the housing, wherein the anti-theft latch sensor is configured for sensing a position of the touch rod to determine a state of the anti-theft latch assembly.

* * * * *